United States Patent

Rosen

[15] 3,648,144

[45] Mar. 7, 1972

[54] STEPPING MOTOR CONTROL SYSTEM

[72] Inventor: Philip J. Rosen, Oak Park, Mich.

[73] Assignee: The Babcock & Wilcox Company, New York, N.Y.

[22] Filed: Dec. 29, 1969

[21] Appl. No.: 888,648

[52] U.S. Cl. .............................................318/696, 318/138
[51] Int. Cl. .......................................................H02k 37/00
[58] Field of Search ..........................318/138, 254, 696, 685; 310/49

[56] References Cited

UNITED STATES PATENTS

| 3,239,738 | 3/1966 | Welch | 310/49 X |
|---|---|---|---|
| 3,328,658 | 6/1967 | Thompson | 318/138 |
| 3,354,367 | 11/1967 | Stockebrand | 318/138 |
| 3,411,058 | 11/1968 | Madsen et al. | 318/138 |
| 3,445,741 | 5/1969 | Gerber | 310/49 X |
| 3,461,365 | 8/1969 | Newland et al. | 318/138 X |
| 3,476,996 | 11/1969 | Fredriksen | 318/138 |
| 3,523,230 | 8/1970 | York | 318/138 X |

Primary Examiner—G. R. Simmons
Attorney—Barnes, Kisselle, Raisch & Choate

[57] ABSTRACT

A stepping motor control system for motors having at least two poles with each pole having a bifilar winding with two input points wherein power is selectively applied to the two input points in accordance with a predetermined sequence.

2 Claims, 16 Drawing Figures

Patented March 7, 1972 3,648,144

2 PHASE WINDING

SLO-SYN MOTOR

SLO-SYN MOTOR WITH
SINUSOIDAL EXCITATION

INVENTOR.
PHILIP J. ROSEN
BY
Barnes, Kisselle, Raisch & Choate
ATTORNEYS

Patented March 7, 1972 3,648,144
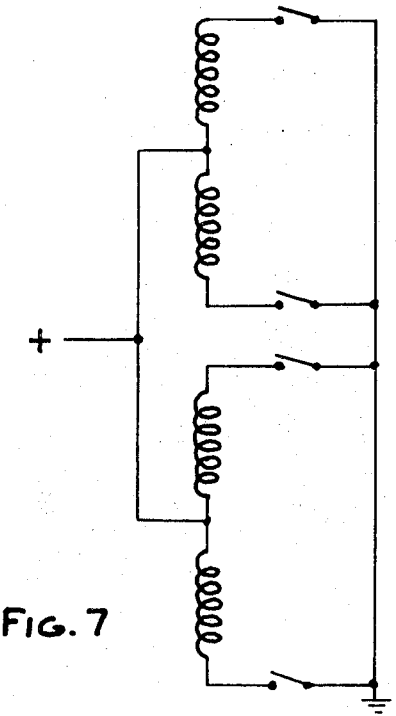
FIG. 7
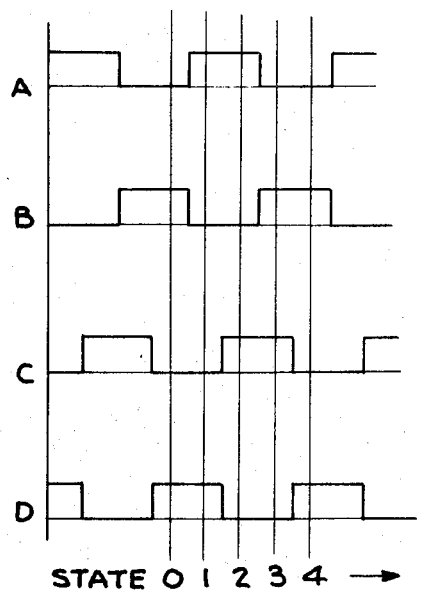
STATE 0 1 2 3 4 →
FIG. 8
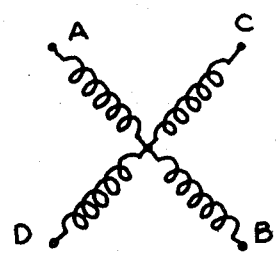
FIG. 9
| | | |
|---|---|---|
| ⌃ | = ↓ | STATE 0 MAJ. |
| ⌄ | = ⌄ | STATE 0 MIN. |
| ⋗ | = ← | STATE 1 MAJ. |
| ⌃ | = ⌃ | STATE 1 MIN. |
| ⋎ | = ↑ | STATE 2 MAJ. |
| ⌃ | = ⌃ | STATE 2 MIN. |
| ⋖ | = → | STATE 3 MAJ. |
| ⌄ | = ⌄ | STATE 3 MIN. |
NEW CYCLE
FIG. 11
| | | |
|---|---|---|
| ⌃ | = ↓ | STATE 0 |
| ⋗ | = ← | STATE 1 |
| ⋎ | = ↑ | STATE 2 |
| ⋖ | = → | STATE 3 |
FIG. 10
INVENTOR.
PHILIP J. ROSEN
BY
Barnes, Kisselle, Raisch & Choate
ATTORNEYS

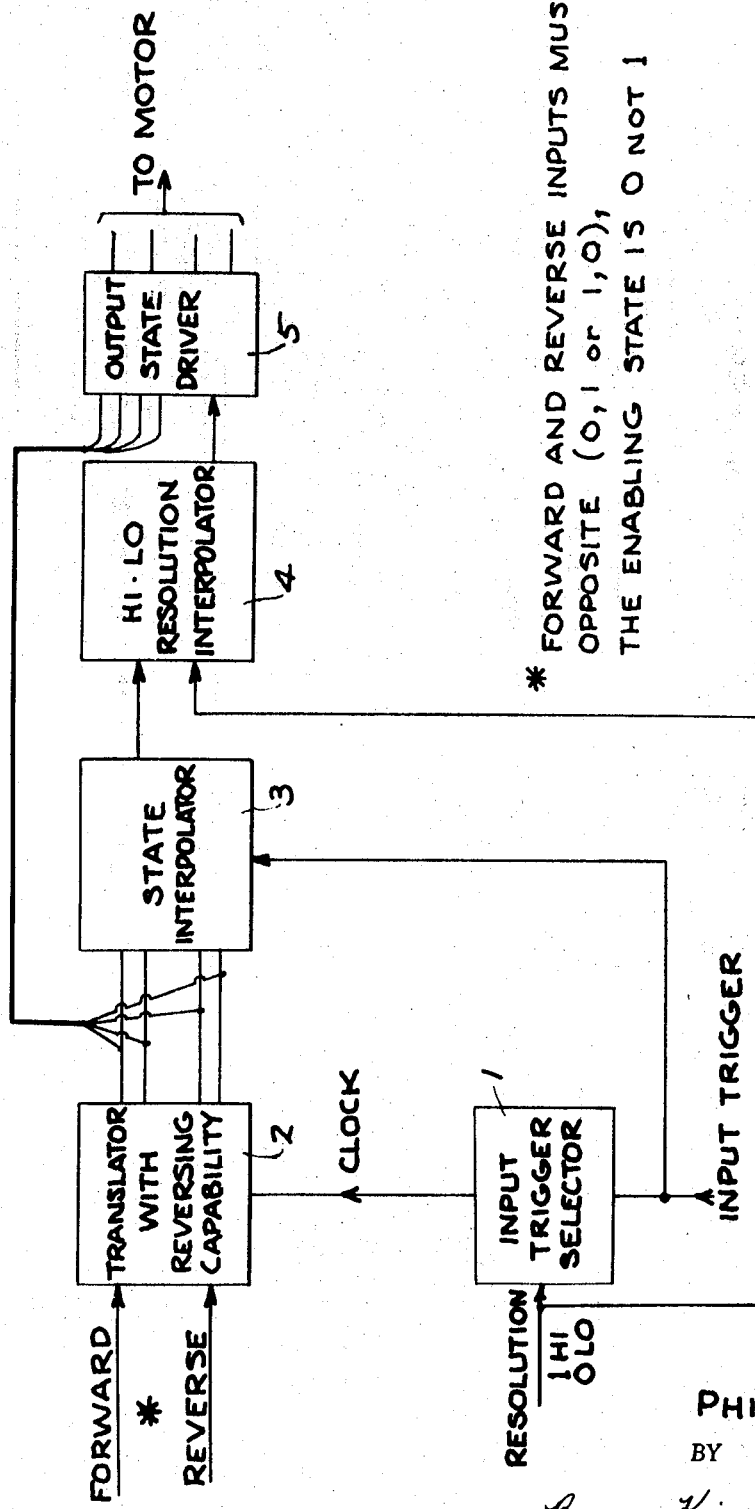

INVENTOR.
PHILIP J. ROSEN
BY
Barnes, Kisselle,
Raisch & Choate
ATTORNEYS

STEPPING MOTOR CONTROL SYSTEM

This invention relates to stepping motors and particularly to stepping motor control circuits.

BACKGROUND OF THE INVENTION

It has become common in the control of mechanical systems to employ what is known as a stepping motor. This is an electric motor, often with 100 electrical poles, and with permanent magnet poles on the rotor. One type of such motor is wound as a two-phase synchronous motor, using a bifilar winding.

These motors are synchronous so that some method is provided to make certain that there is no accumulated slip between rotor position and the position of the driving magnetic vector. Since the slip usually results from the ability of induced rotor poles to move continuously over the surface of the rotor, the usual method is to provide immovable poles by using sliprings and an externally excited DC rotor magnetic field or else permanent magnets in the rotor. The stepping motors of the present invention use permanent magnetic rotors.

Among the objects of the present invention are to provide a control circuit and method of controlling a stepping motor of the aforementioned type in a special mode in order to obtain a greater number of steps per revolution; wherein such control is achieved without changing the structure of the motor; and wherein control can be selectively applied to operate the motor in the conventional mode or in the special mode with the plurality of added steps.

DESCRIPTION OF THE DRAWINGS

FIG. 7 is a schematic diagram of the manner of excitation of a motor in accordance with the invention.

FIG. 8 is a pulse diagram showing the manner in which pulses can be applied in accordance with the invention.

FIG. 9 is a schematic wiring diagram of the motor windings in accordance with the invention.

FIG. 10 is a vector diagram of the motor in one mode of operation in accordance with the invention.

FIG. 11 is a vector diagram of the motor in accordance with another mode of operation.

FIG. 12 is a schematic diagram of a control circuit in accordance with the invention.

DESCRIPTION

Figure 1:
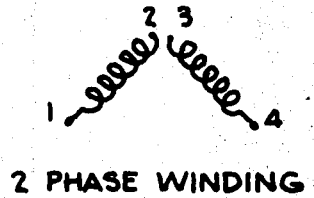
FIGS. 1-5 are schematic diagrams of prior art motors to which the invention is directed.
Figure 2:
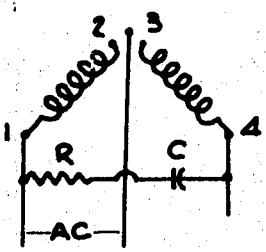

Although the terms two-phase synchronous motor, using a bifilar winding are well understood, for the sake of clarity in later exposition their precise meaning will be briefly reviewed. A two-phase motor has two windings or sets of windings, connected so as to be driven by two AC sources which are approximately 90° out of time phase with each other. It should be understood that there may be more than one pair of poles in the winding. When a full cycle of AC excitation is applied to both windings, the resultant magnetic vector moves smoothly over the angle separating one pole pair from the next. FIG. 1 shows such a winding and FIG. 2 a common method of excitation. The rotor of such a machine has magnetic poles which follow the magnetic vector to produce rotation.

Figure 3:
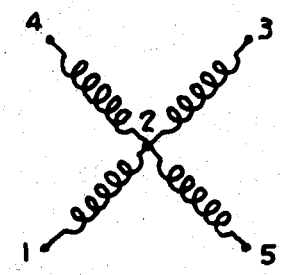

It is possible to provide a means of reversing the magnetic vector's location in space without reversing the polarity of the excitation. This is done by winding the two basic windings in pairs. That is, the wire is looped double and then the winding is set in place two wires at a time as the two ends are spooled out. The loop is then cut in the center and one loop wire is brought out as a winding end, one end wire is brought out as a winding end and the other end wire is spliced to the other loop wire to serve as the center. This is done on both windings and the centers are joined; one common wire being brought out. The connections are shown in FIG. 3. We may now excite the system either with a bipolar source, as before, or with voltage of a single polarity. Consider bipolar sources first. Since the actual common point 2, the junction of all four windings, is buried in the structure and only a single wire is brought out; only half of the winding (FIG. 4) can be used in the synchronous mode with bipolar sinusoidal excitation.

Figure 4:
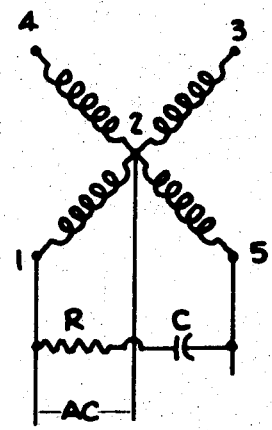
Figure 5:
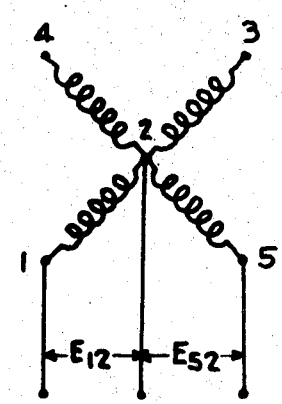
Figure 6:
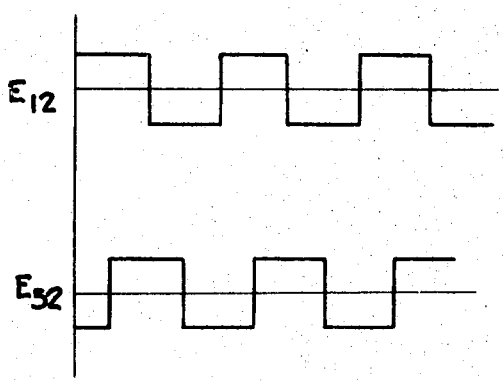
FIG. 6 is a pulse diagram of the operation of the prior art motors.

Because of the fact that the rotor is made with permanent magnetic poles instead of the induced poles normally employed with continuous-rotation motors, the motor connected as shown in FIG. 4, but excited with a square wave rather than a sine wave will move at the same average speed, but will step rather than move continuously. Of course, the phase shifting network does not work very well with square waves—one would ordinarily provide two sources of square waves, 90° apart in time phase as shown in FIGS. 5 and 6.

Alternatively, a single source of DC voltage can be switched into the several windings at will. FIG. 7 shows the situation. The open state of a switch is represented as zero and the closed state as 1 in the associated tabulation, and arbitrarily assume an initial state. In accordance with the prior art, as discussed in U.S. Pat. No. 3,117,268, one winding is switched at a time. That is, power may be switched from A to B or from C to D, but not from A to C or B to D in a given step. A typical sequence is given below:

TABLE 1

| State | A | B | C | D |
|---|---|---|---|---|
| 0 (initial) | 0 | 1 | 0 | 1 |
| 1 | 1 | 0 | 0 | 1 |
| 2 | 1 | 0 | 1 | 0 |
| 3 | 0 | 1 | 1 | 0 |
| 4 | 0 | 1 | 0 | 1 |

It will be noted that this switching sequence is merely a sort of literal translation of sinusoidal excitation of two 90° windings into discrete terms. Thus the behavior of the motor in the stepping mode is directly analogous to that in the synchronous mode.

The method by which this sequence of excitations produces steps is discussed in detail in the aforementioned U.S. Pat. No. 3,117,268. In effect in a cycle of excitation as shown in Table 1, the motor moves one full cycle, that is, through a pair of electrical poles. Each step moves the rotor through 90 electrical degrees. Clearly, therefore, with a 100 pole motor, 200 steps per revolution are produced and 50 full cycles of electrical switching per revolution. FIG. 8 shows the waveforms.

Basically, in accordance with the invention, the motor of the two-phase synchronous type, utilizing bifilar windings is operated in accordance with the following rules: Excitation can be switched between bifilar wound pairs and only one bifilar winding can be switched during any step. Thus, A can be turned off and B turned on, but not A off and C off in one step. In accordance with the above guidelines or rules, the invention contemplates operation of the motor in accordance with the following mode or cycle:

TABLE 2

| State | A | B | C | D | |
|---|---|---|---|---|---|
| 0 Major | 0 | 1 | 0 | 1 | (Old state 0) |
| 0 Minor | 0 | 0 | 0 | 1 | |
| 1 Major | 1 | 0 | 0 | 1 | (Old state 1) |
| 1 Minor | 1 | 0 | 0 | 0 | |
| 2 Major | 1 | 0 | 1 | 0 | (Old state 2) |
| 2 Minor | 0 | 0 | 1 | 0 | |

| | | | | | |
|---|---|---|---|---|---|
| 3 Major | 0 | 1 | 1 | 0 | (Old state 3) |
| 3 Minor | 0 | 1 | 0 | 0 | |

The vector diagram shown in FIGS. 10 and 11 show the relationship of operation of the motor in a conventional mode (FIG. 10) and in accordance with the mode of Table 2 (FIG. 11).

It can be seen that by this arrangement four intermediate states are provided halfway between the major states of the conventional mode and that these states are actual stable obtainable states. It can be seen further that for purposes of convenience, the states are identified as major corresponding to the conventional mode and minor corresponding to the intermediate states.

It can further be appreciated that the additional steps that are produced are made at a sacrifice of output torque because the four minor states are operating at only half power. Furthermore, the two groups A, B and C, D are no longer accurately 90° out of time phase. The overall result is that there is an approximate 20 percent loss of torque. However, the additional steps are achieved permitting more accurate control.

FIG. 12 is a block diagram of a circuit for continuous excitation with the choice of 200 or 400 steps per revolution and of forward or reverse sequence. A two-line binary input controls direction. An input trigger selector steers the input trigger signal as function of the selection of the high or normal resolution mode. The resulting clock output drives a translator 2, which has a reversing capability, and which directs the state interpolator 3 as to the order in which the states should progress corresponding to forward or reverse. The state interpolator output drives the high-low resolution selector 4 which determines whether the additional states described above will or will not be used. Thus producing high-resolution or low-resolution behavior of the motor. The actual output states are controlled by selector 4 and translator 2, being generated in driver 5.

We will discuss these blocks in varying detail. To begin with, however, we must specify the tools with which we work. None of these devices are new—we describe them only for the convenience. They include the four basic gates, the OR, AND, NOR and NAND. Symbols and truth tables for two-input devices of these types are as shown in the following table:

GATE TABLE

| OR | | AND | | NOR | | NAND | |
|---|---|---|---|---|---|---|---|
| Input | Output | Input | Output | Input | Output | Input | Output |
| 0 0 | 0 | 0 0 | 0 | 0 0 | 1 | 0 0 | 1 |
| 0 1 | 1 | 0 1 | 0 | 0 1 | 0 | 0 1 | 1 |
| 1 0 | 1 | 1 0 | 0 | 1 0 | 0 | 1 0 | 1 |
| 1 1 | 1 | 1 1 | 1 | 1 1 | 0 | 1 1 | 0 |

The other basic device is called a "J-K flip-flop." These are integrated circuits which have the equivalent of about 18 transistors interconnected so as to provide the desired characteristics. The symbol and state table (this is a dynamic device, unlike a gate) is shown below:

| States Inputs | | Initial | Output | Final | Output |
|---|---|---|---|---|---|
| J | K | Q | $\bar{Q}$ | Q | $\bar{Q}$ |
| 0 | 0 | 1 | 0 | 1 | 0 |
| 0 | 0 | 0 | 1 | 0 | 1 |
| 0 | 1 | 1 | 0 | 0 | 1 |
| 0 | 1 | 0 | 1 | 0 | 1 |
| 1 | 0 | 1 | 0 | 1 | 0 |
| 1 | 0 | 0 | 1 | 1 | 0 |
| 1 | 1 | 0 | 1 | 1 | 0 |
| 1 | 1 | 1 | 0 | 0 | 1 |

The input states determine the change in output states upon receipt of a clock pulse. This is a very versatile device. If both inputs are 0, it does not switch, whatever state it is in. If one input is 1, it may switch out of one state into the other depending on its state prior to receiving a clock pulse. If both inputs are 1, it will produce a half-frequency square wave at each output.

Figure 13:
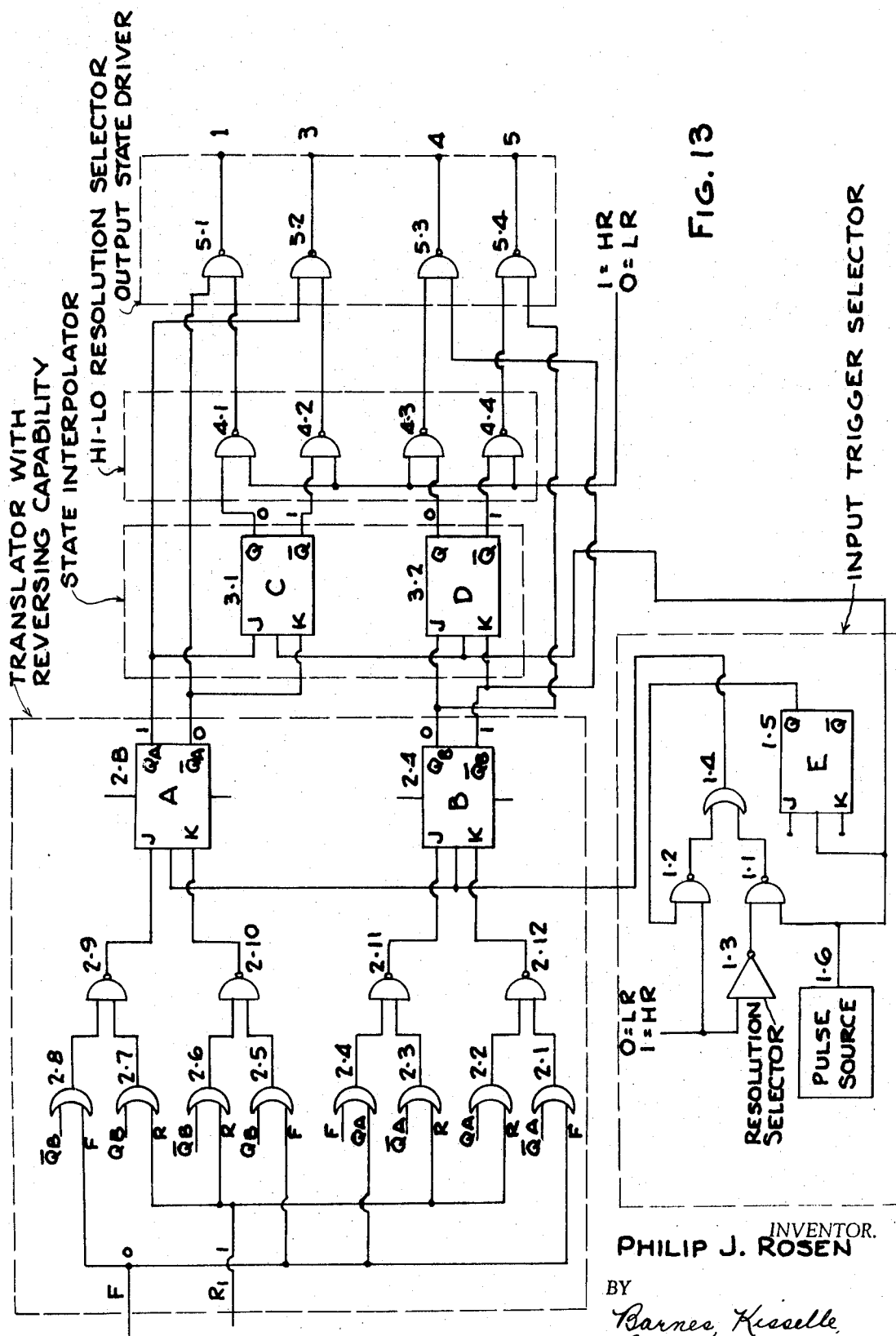
FIG. 13 is a more specific diagram of the control circuit shown in FIG. 12.
Figure 14:
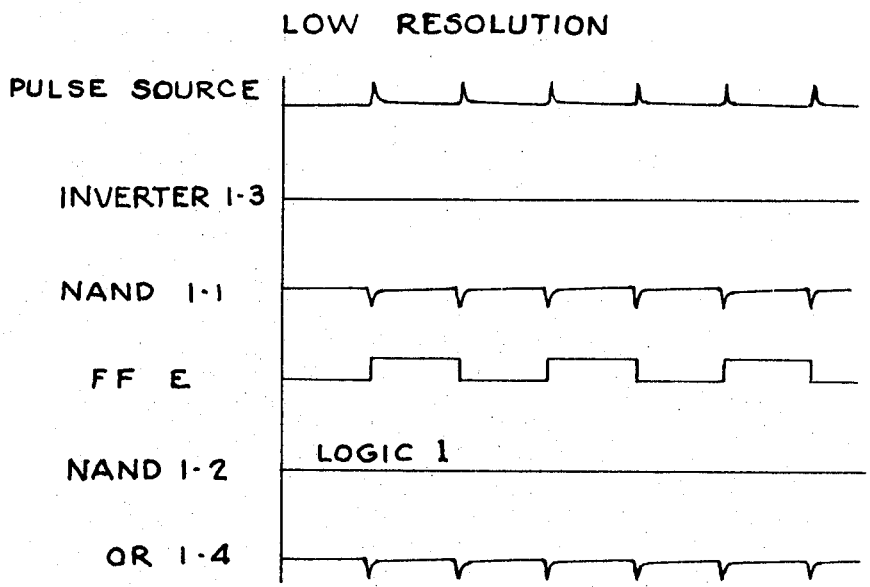
FIGS. 14 and 15 are pulse diagrams of the functioning of the control circuit shown in FIG. 13.
Figure 15:
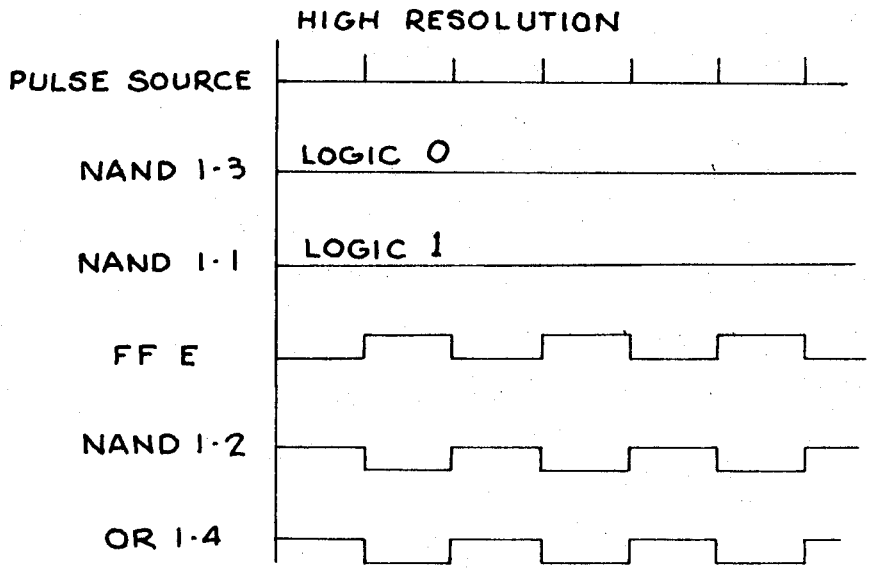
Figure 16:
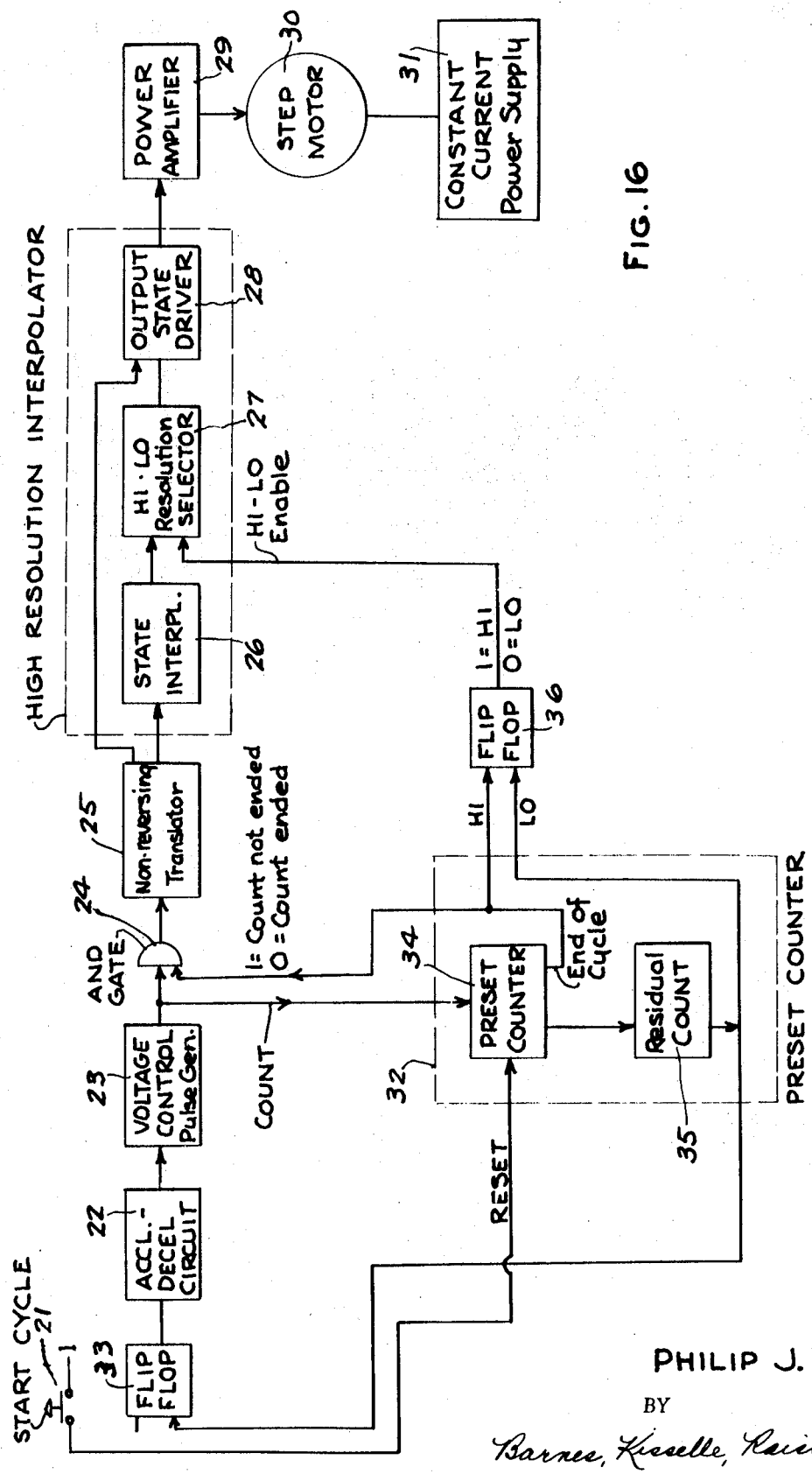
FIG. 16 is a schematic diagram of a modified form of control circuit.

A considerably expanded block diagram is given in FIG. 13.

INPUT TRIGGER SELECTOR

To drive the main translator, this circuit produces a 1x frequency clock (pulse train) in the low-resolution mode and a ½x frequency clock in the high-resolution mode. In the Lo-resolution mode, Inverter 1-3 has output 1, since its input is 0. AND-gate 1-3 then has a 1 input and so reproduces all clock pulses from source 1-6 in its output. Flip-flop E (1-5) produces a ½x square wave described and drives AND-gate 1-2. However, 1-2 has one input 0 and thus maintains an 0 output. Therefore, OR-gate 1-4 reproduces all clock pulses. In the Hi-resolution mode, Inverter 1-3 has output 0 (inputs is 1); therefore, AND-gate 1-1 has 0 output. AND-gate 1-2 and OR-gate 1-4 will simply reproduce the waveform of flip-flop E. However, the translator flip-flops A & B will switch only every other clock pulse.

TRANSLATOR

This system has the two-line, forward-reverse binary level and the clock input from the previous circuit as inputs. It produces directional control signals which drive the state interpolator and output state driver. We will go through one of the four modes (high and low resolution, forward and reverse), in this case high resolution, forward. The others can be described similarly. Note that, if F=1, R=0 and vice versa, and that for any flip-flop, if Q is 0, $\bar{Q}$ is 1 and vice versa. Also note that logic 0 enables the forward and reverse directions, not logic 1. Thus F=0, R=1 in this case. Note further that the major states change only at every other input clock pulse from the pulse source 1-6.

The sequence table for this mode is shown below:

Translator State Table

| $Q_E$ | Step | 2-1 | 2-2 | 2-3 | 2-4 | 2-5 | 2-6 | 2-7 | 2-8 |
|---|---|---|---|---|---|---|---|---|---|
| 1 | 0 | 1 | 1 | 1 | 0 | 0 | 1 | 1 | 1 |
| 0 | 0 | 1 | 1 | 1 | 0 | 1 | 1 | 1 | 0 |
| 1 | 2 | 1 | 1 | 1 | 0 | 1 | 1 | 1 | 0 |
| 0 | 3 | 0 | 1 | 1 | 1 | 1 | 1 | 1 | 0 |
| 1 | 4 | 0 | 1 | 1 | 1 | 1 | 1 | 1 | 0 |
| 0 | 5 | 0 | 1 | 1 | 1 | 0 | 1 | 1 | 1 |
| 1 | 6 | 0 | 1 | 1 | 1 | 0 | 1 | 1 | 1 |
| 0 | 7 | 1 | 1 | 1 | 0 | 0 | 1 | 1 | 1 |

High Res-FWD (F=0)

| 2-9 $J_A$ | 2-10 $K_A$ | 2-11 $J_B$ | 2-12 $K_B$ | Before $Q_A$ $Q_B$ | After $Q_A$ $Q_B$ |
|---|---|---|---|---|---|
| 0 | 1 | 1 | 0 | 0 0 | 0 1 |
| 1 | 0 | 1 | 0 | 0 0 | 0 1 |
| 1 | 0 | 1 | 0 | 0 1 | 1 1 |
| 1 | 0 | 0 | 1 | 1 1 | 1 1 |
| 1 | 0 | 0 | 1 | 1 1 | 1 0 |
| 0 | 1 | 0 | 1 | 1 1 | 1 0 |
| 0 | 1 | 0 | 1 | 1 0 | 0 0 |
| 0 | 1 | 1 | 0 | 0 0 | 0 0 |

As can be seen, the outputs describe a closed cycle. This mode can be now followed through the rest of the circuit.

STATE INTERPOLATOR

This circuit takes the output states from the translator and the 1x frequency clock pulses and produces intermediate states. As is evident, it does not differ from the outputs of the translator, except that it shifts state on odd-numbered rather than even-numbered clock pulses.

HIGH-LOW RESOLUTION SELECTOR

To continue with the example, this accepts the state interpolator output and the resolution level (1 for high, 0 for low) to produce half of the driver inputs. The output states are shown in the following table:

STATE INTERPOLATOR STATE TABLE

| | | | Before | | | After | | | | | | |
|---|---|---|---|---|---|---|---|---|---|---|---|---|
| $Q_E$ | Clock | State | $Q_A$ | $Q_B$ | $Q_C$ | $Q_D$ | $Q_C$ | $Q_D$ | 4-1 | 4-2 | 4-3 | 4-4 |
| 1 | 1 | 0 | 0 | 0 | 0 | 0 | 0 | 0 | 1 | 0 | 1 | 0 |
| 0 | 1 | 1 | 0 | 1 | 0 | 0 | 0 | 1 | 1 | 0 | 1 | 0 |
| 1 | 1 | 2 | 0 | 1 | 0 | 1 | 0 | 1 | 1 | 0 | 0 | 1 |
| 0 | 1 | 3 | 1 | 1 | 0 | 1 | 1 | 1 | 1 | 0 | 0 | 1 |
| 1 | 1 | 4 | 1 | 1 | 1 | 1 | 1 | 1 | 0 | 1 | 0 | 1 |
| 0 | 1 | 5 | 1 | 0 | 1 | 1 | 1 | 0 | 0 | 1 | 0 | 1 |
| 1 | 1 | 6 | 1 | 0 | 1 | 0 | 1 | 0 | 0 | 1 | 1 | 0 |
| 0 | 1 | 7 | 0 | 0 | 1 | 0 | 0 | 0 | 0 | 1 | 1 | 0 |

OUTPUT STATE DRIVER

This combines signals from the translator and the previous selector to produce output states in a high-resolution mode as shown in the following table:

| | | | | | | | Output Lines | | | |
|---|---|---|---|---|---|---|---|---|---|---|
| State | $Q_A$ | $Q_B$ | 4-1 | 4-2 | 4-3 | 4-4 | 1 | 3 | 4 | 5 |
| 0 | 0 | 0 | 1 | 0 | 1 | 0 | 1 | 0 | 1 | 0 |
| 1 | 0 | 1 | 1 | 0 | 1 | 0 | 1 | 0 | 0 | 0 |
| 2 | 0 | 1 | 1 | 0 | 0 | 1 | 1 | 0 | 0 | 1 |
| 3 | 1 | 1 | 1 | 0 | 0 | 1 | 0 | 0 | 0 | 1 |
| 4 | 1 | 1 | 0 | 1 | 0 | 1 | 0 | 1 | 0 | 1 |
| 5 | 1 | 0 | 0 | 1 | 0 | 1 | 0 | 1 | 0 | 0 |
| 6 | 1 | 0 | 0 | 1 | 1 | 0 | 0 | 1 | 1 | 0 |
| 7 | 0 | 0 | 0 | 1 | 1 | 0 | 0 | 0 | 1 | 0 |

This produces a series of states which will rotate the motor in 45 electrical degree steps. (As it happens this sequence is backwards; the motor will run in the opposite direction to that in Table 3, but we can cure that by enabling R instead of F.) It is possible, by similar reasoning, to derive the state tables for the other 3 modes. The table for FWD-Low is shown below:

| State | 2-1 | 2-2 | 2-3 | 2-4 | 2-5 | 2-6 | 2-7 | 2-8 | $J_A$ | $K_A$ | $J_B$ | $K_B$ | $Q_A$ | $Q_B$ | $Q_C$ | $Q_D$ |
|---|---|---|---|---|---|---|---|---|---|---|---|---|---|---|---|---|
| 0 | 1 | 1 | 1 | 0 | 0 | 1 | 1 | 1 | 0 | 1 | 1 | 0 | 0 | 0 | 0 | 0 |
| 1 | 1 | 1 | 1 | 0 | 1 | 1 | 1 | 0 | 1 | 0 | 1 | 0 | 0 | 1 | 0 | 1 |
| 2 | 0 | 1 | 1 | 1 | 1 | 1 | 1 | 0 | 1 | 0 | 0 | 1 | 1 | 1 | 1 | 1 |
| 3 | 0 | 1 | 1 | 1 | 0 | 1 | 1 | 1 | 0 | 1 | 0 | 1 | 0 | 1 | 0 | 1 |
| 4 | 1 | 1 | 1 | 0 | 0 | 1 | 1 | 1 | 0 | 1 | 1 | 0 | 0 | 0 | 0 | 0 |
| 5 | | | | | | | | | | | | | | | | |
| 6 | | | | | | | | | | | | | | | | |
| 7 | | | | | | | | | | | | | | | | |

| State | $Q_C$ | $Q_D$ | 4-1 | 4-2 | 4-3 | 4-4 | 1 | 3 | 4 | 5 |
|---|---|---|---|---|---|---|---|---|---|---|
| 0 | 0 | 0 | 1 | 1 | 1 | 1 | 1 | 0 | 1 | 0 |
| 1 | 0 | 1 | 1 | 1 | 1 | 1 | 1 | 0 | 0 | 1 |
| 2 | 1 | 1 | 1 | 1 | 1 | 1 | 0 | 1 | 0 | 1 |
| 3 | 1 | 0 | 1 | 1 | 1 | 1 | 0 | 1 | 1 | 0 |
| 4 | 0 | 0 | 1 | 1 | 1 | 1 | 1 | 0 | 1 | 0 |

Clearly, a full motor cycle is achieved every 4 steps since the 0 input disables the state interpolator output and the translator now receives a pulse for every input clock pulse.

UNIDIRECTIONAL OPEN LOOP POSITION SYSTEM

Operation of this system depends on generating a pulse train whose number of pulses corresponds to a preset number on the counter. Each pulse corresponds to a known increment of motor rotation. Acceleration and deceleration is provided by controlling the analog input voltage to a voltage-controlled pulse generator.

The operation is as follows: it is desired to move a specified number of motor steps, which are set on the preset counter 32. A majority of steps will be full steps (1.8° in the case of a conventional 200-step motor) but a fixed number of steps after the deceleration command will be half steps, due to the transfer into the high-resolution mode. The high-resolution mode in this case is used to obtain more accurate positioning without compromising slewing speed. The counter 34 is set to the desired total number of steps and the "residual count" gate 35 is set to a suitable number of high-resolution steps. The "start cycle" button 21 is then actuated which sets flip-flop 33 into the 1 state. This output voltage starts the acceleration-deceleration circuit 22 which integrates upward at a predetermined rate and clamps at a voltage corresponding to the maximum speed level. The voltage-controlled pulse generator 23 now delivers pulses at an increasing rate to the AND-gate 24. The start cycle pulse also resets counter 34, so that its "end of cycle" output line is at 1, representing "count not complete". Gate 24 therefore transmits the control pulses to the translator 25. This is a nonreversing translator, and is appreciably simpler than the one shown as item 2 of FIG. 12, which has reversing capability. The state table is shown below:

| High Res. Mode | | | | Low Res. Mode | | | |
|---|---|---|---|---|---|---|---|
| State | E | $Q_A$ | $Q_B$ | State | Clock | $Q_A$ | $Q_B$ |
| 0 | 1 | 0 | 0 | 0 | 1 | 0 | 0 |
| 1 | 0 | 0 | 1 | 1 | 1 | 0 | 1 |
| 2 | 1 | 0 | 1 | 2 | 1 | 1 | 1 |
| 3 | 0 | 1 | 1 | 3 | 1 | 1 | 0 |
| 4 | 1 | 1 | 1 | 4 | 1 | 0 | 0 |
| 5 | 0 | 1 | 0 | | | | |
| 6 | 1 | 1 | 0 | | | | |
| 7 | 0 | 0 | 0 | | | | |

The translator drives the high-resolution interpolator 26, 27, 28, which is held in the low mode by flip-flop 36. The interpolator's output state driver 28 drives the power amplifiers 29 which in turn drive the motor 30. When it is time to begin deceleration, the "fixed count remaining" gate 35 switches, resetting flip-flops 33 and 36. Flip-flop 36 throws the high-low resolution selector 27 in the high-resolution mode so that the motor steps are half as large. Flip-flop 33 drops the input level to the acceleration-deceleration circuit 22 to a low value so that 22 must integrate downward, reducing the voltage to the pulse generator 23 and reducing the pulse frequency. This slows the motor at a continuous rate, aided by the fact that the steps are now smaller. When the preset counter 34 counts out, the AND-gate 24 is cut off, stopping the transmission of further pulses and locking the motor in the last state. Flip-flop 36 is now reset to high.

I claim:

1. A circuit for controlling a motor having at least two poles, each pole having a bifilar winding with two input points thereby providing four input points, said control circuit comprising means for selectively applying power to the two input points of the two poles in accordance with the following sequence:

| A | B | C | D |
|---|---|---|---|
| 0 | 1 | 0 | 1 |
| 0 | 0 | 0 | 1 |
| 1 | 0 | 0 | 1 |
| 1 | 0 | 0 | 0 |
| 1 | 0 | 1 | 0 |
| 0 | 0 | 1 | 0 |
| 0 | 1 | 1 | 0 |
| 0 | 1 | 0 | 0 | wherein A and B are the two input points of one winding and C and D are the two input points of the other winding, means for selectively energizing the windings in accordance with the following sequence:

| A | B | C | D |
|---|---|---|---|
| 0 | 1 | 0 | 1 |
| 1 | 0 | 0 | 1 |
| 1 | 0 | 1 | 0 |
| 0 | 1 | 1 | 0 |
| 0 | 1 | 0 | 1 | means for introducing a predetermined plurality of signals to said control circuit and means for initially applying power in accordance with the first-mentioned mode and thereafter applying power in accordance with the second-mentioned mode, said means being operable to switch to operation by the second-mentioned mode when a predetermined number of said plurality of pulses is remaining.

2. The control circuit set forth in claim 1 including directional control means for changing the sequence of application of power to reverse the rotation of the motor.

* * * * *